(No Model.)
O. S. EMERSON.
Steam Valve.
No. 233,491.            Patented Oct. 19, 1880.
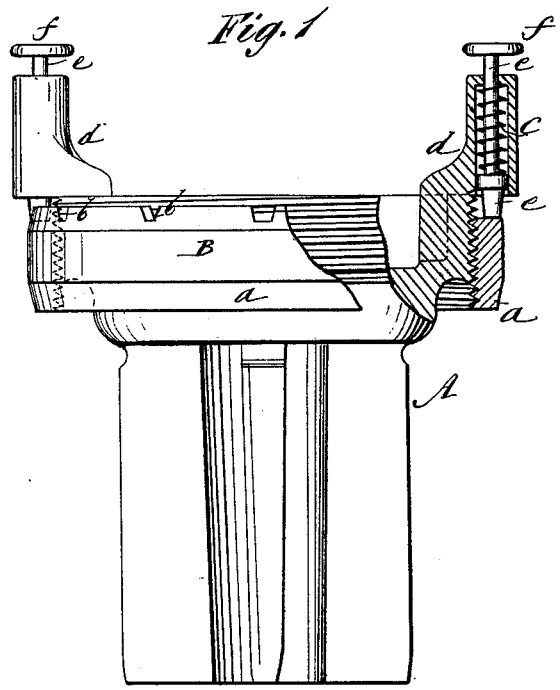
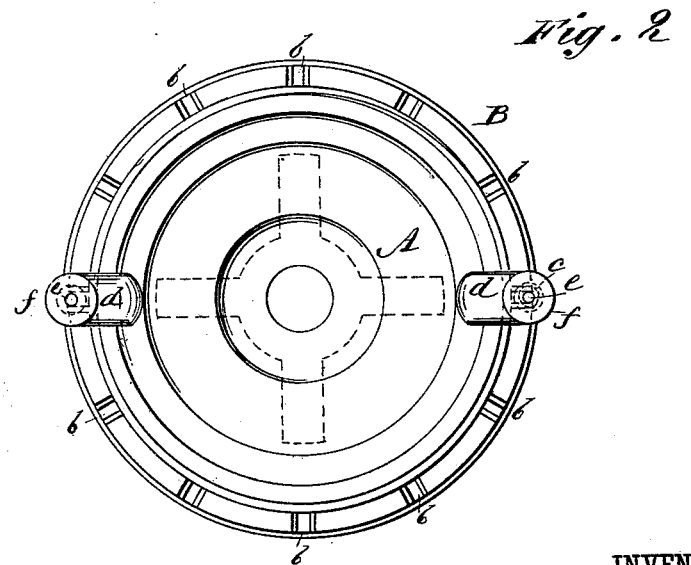
WITNESSES:
C. Neveux
C. Sedgwick
INVENTOR:
O. S. Emerson
BY Munn & Co
ATTORNEYS.

UNITED STATES PATENT OFFICE.

ORLANDO S. EMERSON, OF ELKHART, INDIANA, ASSIGNOR TO HIMSELF AND JOSEPH S. GRAHAM, OF SAME PLACE, SAID EMERSON AND GRAHAM ASSIGNORS OF ONE-HALF OF THEIR RIGHT TO JOHN GRISWOLD AND HENRY J. BURTON, OF SAME PLACE.

STEAM-VALVE.

SPECIFICATION forming part of Letters Patent No. 233,491, dated October 19, 1880.

Application filed June 19, 1880. (No model.)

*To all whom it may concern:*

Be it known that I, ORLANDO S. EMERSON, of Elkhart, in the county of Elkhart and State of Indiana, have invented a new and useful Improvement in Steam-Valves, of which the following is a specification.

My improvements relate to puppet-valves which have heretofore been constructed with an adjustable lip, fitted for movement by a screw-ring to adjust the lip, and held in place by screw-pins entering notches in the ring. In such valves the screw-pins become loose or are jarred off, so that the adjustment is unreliable.

The object of my invention is to avoid these difficulties; and the invention consists in a spring-pin used in place of a screw for retaining the adjustable lip in place.

In the accompanying drawings, forming part of this specification, Figure 1 is a sectional side elevation of a valve fitted with my improvements; and Fig. 2 is a plan view of the same, partly in section.

Similar letters of reference indicate corresponding parts.

A is the valve, formed with a screw-thread upon its outside at the upper end, and having the screw-ring B fitted upon the thread. The ring B is formed with an annular lip or rim, *a*, at its under side, which lip is adjusted by screwing the ring up and down on the valve. These parts are as usual.

The ring B is formed on its upper edge with notches *b* placed at short intervals. At the upper end of the valve there are formed lugs *d*, which project outward over the ring B, and are formed with vertical apertures for receiving the pins *e*. These pins *e* are formed at their lower ends for entering the notches *b*, and are fitted around their reduced portion within the lugs *d* with spiral springs *c*, that tend to force the pins downward and retain them in engagement with the notches *b*.

The upper ends of the pins *e* are fitted with buttons *f* for use in raising the pins when it is desired to disengage them from the ring.

In operation, the lip *a* being adjusted by turning the ring B on the valve, while the pins *e* are raised, the said pins then engage with the notches beneath them and hold the ring securely against turning. The spring-pins are much more reliable for this purpose than screw devices, as they are not liable to misplacement by jarring or to become loose.

I am aware that I am not the inventor of the combination of a valve, an adjustable lip secured directly thereto, and a spring-catch for maintaining the lip in its proper position with relation to the valve, and I desire to disclaim such combination.

Having thus described my invention, what I claim as new, and desire to secure by Letters Patent, is—

In combination with a valve having the hollow post or standard *d*, the vertically-reciprocating pin *e*, having the spring *c*, adapted to engage with the notched and adjustable lip B, and hold the same in proper position with relation to the valve, substantially as described and shown.

ORLANDO SAWTELL EMERSON.

Witnesses:
E. H. ODREN,
J. S. FRAHAM.